United States Patent [19]

Hardie et al.

[11] Patent Number: 5,330,556
[45] Date of Patent: Jul. 19, 1994

[54] METHOD FOR TREATING GAS AND PARTICULATE SOLIDS IN A FLUID BED

[75] Inventors: Gregory J. Hardie, East Fremantle; John M. Ganser, Attadale; Ian D. Webb, Port Kembla, all of Australia; Timo Hyppänen; Karl Myöhänen, both of Karhula, Finland; Ismo Nopanen, Summa, Finland

[73] Assignees: Hismelt Corporation Pty Limited, Kwinana, Australia; Ahlstrom Corporation, Karhula, Finland

[21] Appl. No.: 939,917

[22] Filed: Sep. 3, 1992

[30] Foreign Application Priority Data

Sep. 25, 1991 [DE] Fed. Rep. of Germany ....... 4131962

[51] Int. Cl.⁵ .............................................. C22B 5/14
[52] U.S. Cl. ........................................ 75/414; 75/444; 75/446
[58] Field of Search ................................ 75/444, 446; 423/DIG. 16; 266/157, 172

[56] References Cited

U.S. PATENT DOCUMENTS 2,968,683  1/1961  Kossmann ..................... 260/683
5,213,768  5/1993  Maurel et al. ............. 423/DIG. 16

FOREIGN PATENT DOCUMENTS 553033     5/1983  Australia .
0101893A2  7/1983  European Pat. Off. .
1001241    1/1957  Fed. Rep. of Germany .
1250786    9/1967  Fed. Rep. of Germany .
2742644C2  3/1978  Fed. Rep. of Germany .
1100227    4/1989  Japan ............................ 75/444
2177616    1/1987  United Kingdom .

Primary Examiner—Melvyn J. Andrews
Attorney, Agent, or Firm—Nixon & Vanderhye

[57] ABSTRACT

A method for treating gases and solids in a fluid bed, the fluid bed reactor substantially comprising, regarded downstream, a mixing chamber, a riser pipe and a cyclone with a solids return pipe to the mixing chamber, the gases being introduced into the mixing chamber at a gas rate immediately before the inlet port of the mixing chamber of more than 35 m/sec.

20 Claims, 2 Drawing Sheets

METHOD FOR TREATING GAS AND PARTICULATE SOLIDS IN A FLUID BED

The present invention relates to a method and apparatus for treating gases and solids in a fluid bed, the fluid bed reactor substantially comprising, regarded downstream, a mixing chamber, a riser pipe and a cyclone with a solids return pipe to the mixing chamber.

The present invention is advantageously applicable for reducing metal ores with hot reducing gases, in particular the hot waste gas from a smelting reduction vessel. The present invention is also particularly advantageous for the purifying and fast cooling of waste gases containing dangerous and problematic, e.g. glutinous, substances.

Fluidization is being applied increasingly in large-scale industrial practice. Processes for purifying hot contaminated waste gases from the metallurgical and chemical industries have become known, for instance, that are based on the technology of the circulating fluid bed. The unproblematic recovery of heat in this procedure is stated as an additional advantage.

For example, Australian patent 553 033 describes a method in the so-called Fluxflow reactor for recovering heat from a gas loaded with melted drops that is brought in contact with the heating surfaces of a heat exchanger, characterized in that the gas temperature before the heat exchanger is reduced below the eutectic temperature of the melted drops by admixing solid particles to the gas loaded with melted drops. The stated data for the described method are a gas rate of 3 to 20 m/sec, a particle content of the gas of 10 to 500 g/mol, an inlet gas temperature of 300° to 1500° C., an outlet gas temperature of 500° to 1200° C. and an average particle size of 100 to 2000 micrometers.

Another broad range of application for fluid bed technology is coal gasification. German patent no. 27 42 644 relates to a method for continuous gasification of carbonaceous solids and an apparatus for carrying out this method. In this process the solids pass through at least three zones from top to bottom in a shaft-like vessel. The rates of the descending product stream are at most 5 m/min, and the flow rate of the fluidizing gas for keeping the solids in a whirled up state is at most about 6 m/sec.

European patent application no. 03 04 931 relates to a method and apparatus for gasification or combustion of solid carbonaceous materials in a circulating fluid bed wherein the gas rate in the fluid bed reactor is kept at a high level of 2 to 10 m/sec and a considerable proportion of the solids is discharged from the reaction vessel with the gas, separated in a subsequent cyclone and then fed back to the reactor vessel. The preliminarily purified gas is then freed from the fine solids in a gas purifying facility. The process is characterized in that this fine material from the gas purifying facility agglomerates with the circulating material from the cyclone and is finally also fed to the reactor vessel. With a circulating fluid bed reactor of the Fluxflow type, that is used for example for recovering heat from a hot gas stream or for treating solid particles with hot gases, the hot gas is fed into the reactor as a fluidizing gas through a usually circular port in the bottom. No grate is necessary for holding the fluid bed material in a Fluxflow reactor. This system of course also has some disadvantages, in particular when used on a large scale. The gases introduced into the fluid bed cannot always prevent heavy solid particles from falling out of the fluid bed countercurrently through the inlet port on the bottom of the reactor. Particularly the strong downward flow of the solid particles on the outer walls of the reactor causes particles to flow out through the inlet port of the reactor. It is also known that turbulence in the solid-gas flow system increases these losses through the inlet port. This backflow of solid particles into the main process facility preceding the fluid bed reactor can lead to problems and complicates the process control. Furthermore, the particles or cakes of particles that fall through the inlet port can cause disturbances, turbulence and a reduced gas rate in the gas stream itself, thereby causing disturbances in the buildup of the fluid bed in the mixing chamber.

The problem on which the invention is based is accordingly to design a method and apparatus in such a way that no solid particles escape from the mixing chamber through the inlet port countercurrently to the introduced gases when gases are introduced into a mixing chamber with a fluid bed of solid particles. A further, more specific problem on which the invention is based is to design a method and apparatus for reducing metal ores by the fluid bed technique, that is advantageously applied here, in such a way that very hot reducing gases, for example waste gases from a smelting reduction vessel, are fed at a temperature over 1700° C. directly into the mixing chamber and cooled in the mixing chamber to a favorable reduction temperature whereby no appreciable amounts of solid particles escape from the mixing chamber countercurrently into the reducing gas feed pipe. An additional objective of the invention is to design the method in such a way that it can be advantageously operated in conjunction with a smelting reduction process.

This overall problem is solved by the invention by introducing the gases into the mixing chamber at a gas rate immediately before the inlet of the mixing chamber of more than 35 m/sec.

According to an advantageous embodiment of the invention the hot gas is introduced into the mixing chamber through a gas inlet pipe having a length (l) to diameter (D) ratio l/D greater than 1, and the downward marginal flow of the solid particles in the lower conic portion of the mixing chamber, that has an angle of inclination smaller than 70°, is guided so as to meet the substantially vertical upward flow of the hot gases at the gas inlet port of the mixing chamber at an angle of at least 20°.

The method according to the invention prevents solid particles from escaping into the gas inlet pipe on the bottom of the mixing chamber and causes all solid particles to leave the mixing chamber only in the direction of flow.

The apparatus according to the invention is preferably characterized in that the mixing chamber has a gas inlet pipe through which the gases pass into the mixing chamber, the gas inlet pipe having a length to diameter ratio l/D greater than 1 and the mixing chamber having a lower conic portion whose walls have an angle of inclination smaller than 70°.

When the inventive method is applied for reducing metallic oxides a fluid bed or circulating fluid bed is preferably used. The reactor comprises a mixing chamber in which the metal ores and the hot reducing gas are mixed, a cyclone for separating these solid particles and the gases from the mixing chamber, a riser pipe that feeds the suspension stream of solid particles and gas from the mixing chamber into the cyclone, and a solids return pipe for transporting at least part of the solids from the cyclone into the mixing chamber.

Contrary to the prevailing view that high blow-in rates in the mixing chamber lead to disadvantages, the inventive high inlet rate of the hot gases entering the mixing chamber (greater than 35 m/sec) has surprisingly resulted in advantageous flow characteristics in the mixing chamber that are reflected in a number of positive effects. The inventive high inlet gas rates in the mixing chamber unexpectedly result, not in the disadvantages described in the prior art, but in the advantageous effects now explained in more detail.

By applying the invention in a Fluxflow ® reactor one can achieve a selective temperature adjustment of the mixture of solid particles, such as metal ore, sand or waste gas dust, and hot gas, such as waste gas from the smelting reduction vessel or waste gas from a furnace chamber.

For this purpose part or all of the inner surface of the mixing chamber is positively cooled, for example water-cooled, according to the invention. Part of the inner wall of the mixing chamber can be lined with one or more layers of refractory material, including positively cooled areas. By selecting the ratio of positively cooled inner surface not lined with refractory material to inner surface insulated with refractory material one has a first possibility of control for adjusting the temperature of the fluid bed mixture in the mixing chamber. A further possibility of control results from the selection of the coolant that flows through the cooling ducts of the inner surface of the mixing chamber. For example one can use water, oil, water vapor, compressed air or mixtures thereof.

A further measure for controlling the temperature of the fluid bed mixture in the mixing chamber is to regulate the supplied amount of new solid particles, such as metal ore. Furthermore, coolants such as water vapor, water and/or oil can also be sprayed directly into the mixing chamber.

An essential feature of the invention results from the use of the mixing chamber as a cooler for the hot reducing gas as soon as the inlet temperature of the reducing gas is higher than the optimal reduction temperature for the metal ores. The reducing gas used is mainly the waste gas from a smelting reduction vessel. Its temperature is normally clearly above the required advantageous reduction temperature. This waste gas is customarily loaded with dust and passes into the mixing chamber at a relatively high speed in the center from one side, for example from below. According to the invention the inlet rate is over 35 m/sec, and it can vary, for example in accordance with the particle size and the specific weight of the particles, the fluid bed height in the mixing chamber, the total amount of circulating fluid bed material, the dimensions and form of the mixing chamber.

The minimum speed is also dependent to a certain extent on the operating pressure of the hot introduced gases. The minimum gas rate is lower at a higher operating pressure. In the case of waste gas from a smelting reduction facility the pressure in the smelting reduction vessel can also influence the pressure in the mixing chamber. For example, if the inventive method is applied under otherwise equal conditions the inlet gas rate in the mixing chamber can be at least 120 m/sec at an operating pressure of about 1.5 bars and at least 85 m/sec at an operating pressure of about 3.5 bars.

The flow pattern arising in the mixing chamber is determined by the relatively high inlet gas rate and also by the form and dimensions of the gas inlet pipe and the lower portion of the mixing chamber. This ensures according to the invention that the fluid bed remains in the mixing chamber and the temperature of the hot gases is optimally reduced. In the reduction of metal ores the fast cooling of the gases leads to a fast temperature decrease in the introduced reaction gases to a temperature advantageous for reduction, and the good mixture of gas and solids results in their uniform reduction in the fluid bed. In a Fluxflow reactor the flow characteristics can probably be imagined to be such that the flow approximately follows the axis of symmetry in the center, going in the opposite direction on the vessel walling. This results in an inner circulating flow. With the typical vertical position of the mixing chamber there is an ascending flow in the center of the vessel and a descending flow on the outer wall of the vessel.

According to the invention the cone angle of inclination of the lower portion of the mixing cheer and thus the downflow direction of the particles is limited to less than 70°, preferably 45° to 70°. The inlet port for the hot gas is preferably disposed in the center of the lower conic portion of the mixing chamber. The mixing chamber also comprises a cylindrical central portion and an upper conic area with the central port for the connected riser pipe. It has proven to be particularly advantageous for the lower conic portion of the mixing chamber to form an angle of inclination with the horizontal between 45° and 70° since particularly preferred flow characteristics surprisingly result at this angle. If this angle of inclination, i.e. the angle of inclination of the walls in the lower conic area of the mixing chamber, is greater than 70° the downflow of the particles increasingly approaches the vertical direction and the particles can then pass into the gas feed pipe at high speed. These particles that escape from the mixing chamber and are thus lost to the fluid bed can also lead to crusts in the gas inlet pipe and therefore prove to be problematic for the gas flow.

The gas inlet pipe is inventively constructed so as to have a length to diameter ratio l/D greater than 1 in order to ensure that particles or particle agglomerates possibly passing into the gas feed pipe disintegrate there and are transported back into the mixing chamber by the high gas rate in the inlet pipe.

According to the invention the solid particles leave the mixing chamber together with the reducing gas only in the direction of flow, i.e. they flow solely into the subsequent riser pipe. The discharge of solid particles from the mixing chamber into the gas feed pipe contrary to the direction of flow is probably prevented by the high inlet gas rate of more than 35 m/sec. In particular if the inventive method is combined with a smelting reduction facility, whereby the particles present in the fluid bed in the mixing chamber have dimensions greater than 1 mm and a specific weight D greater than 4 $g/cm^3$, this effect is particularly advantageous if the gas rate immediately before the inlet port of the mixing chamber is at least 60 m/sec, preferably at least 100 m/sec.

In other applications, for example for cooling and/or purifying hot gases from gas turbine combustors, gasifiers or other high-temperature processes such as sintering plants, in a fluid bed with a main particle size of 4 to 200 micrometers and a specific weight D less than 4 $g/cm^3$ the inventive method can be successfully used for preventing particles, for example flue dust, from passing out of the mixing chamber into the gas feed pipe. The rate of the hot gases immediately before the inlet port of the mixing chamber is then preferably adjusted between 35 and 80 m/sec.

As already mentioned, the invention can be successfully employed in processes for reducing metal ores. The optimal temperature for reducing the metal ores prevails in the riser pipe of the fluid bed reactor. The measures for temperature adjustment are already described. In practice one can start out from the known mean temperature and amount of reducing gas, and known substance feeding rates for ore, returns from the cyclone, including carrier gas and various additives, for example slag forming agents. A thermal balance can be set up on this basis and the theoretical gas temperature at the exit of the mixing chamber calculated. This theoretical gas temperature is normally above the optimal reducing gas temperature, and the heat dissipation and the ratio of positively cooled to refractorily lined inner wall surfaces in the mixing chamber must be fixed accordingly so that the reducing gas temperature at the entrance to the riser pipe corresponds to the desired temperature.

The vertical position of the mixing chamber with the reducing gas inlet port at the bottom on the mixing chamber in the area of the axis of symmetry and the riser pipe connected to the mixing chamber on the opposite side constitutes an advantageous design of the invention but is not the only possible construction.

The amount of solids recycled from the cyclone to the mixing chamber, which can be partly reduced metallic oxides for example, then rises again with the fluid bed of the mixing chamber, thereby maintaining the function of a circulating fluid bed. It is possible to use two or more cyclones in a fluid bed reactor, e.g. in order to improve the separation of fine dusts.

Any desired proportion of the product stream can be branched off from the solids return pipe and fed to further processing steps or a storage tank. It has proved to be particularly advantageous and within the scope of the invention to feed the partly reduced metallic oxides directly, i.e. in the still heated state, to a smelting reduction facility, for example the smelting reduction vessel in which the waste gas for the mixing chamber arises.

The density of the fluid bed varies in different parts of the facility. The fluid bed density, i.e. the density of the suspension of solid particles and gas, is thus between 10 $kg/m^3$ and 200 $kg/m^3$, but preferably between 20 and 100 $kg/m^3$, in the mixing chamber. In the connected riser pipe the product stream density is lower, and in the upper portion, i.e. before entrance into the cyclone, it is 2 $kg/m^3$ to 30 $kg/m^3$, but preferably 3 $kg/m^3$ to 10 $kg/m^3$. In the connected solids return pipe from the cyclone to the mixing chamber the product stream density is normally above the values before entrance into the cyclone.

The mixing chamber is an important facility for the Fluxflow reactor to which the inventive method relates. It is normally a rotationally symmetrical, prolate type of vessel having at the lower end the connection for the reducing gas feed pipe and passing at the upper end into the riser pipe. The free diameter of the riser pipe is normally greater than the free diameter of the reducing gas feed pipe. The solids return pipe ends in the mixing chamber. New material, for example non-prereduced or raw metal ore, is fed to the process in the mixing chamber via a separate connection.

The invention shall be explained in more detail with reference to the drawing and an example.

FIG. 1 shows a schematic representation of the longitudinal section through the mixing chamber of a fluid bed reactor as is used when the invention is applied for reducing metal ores.

Figure 1:
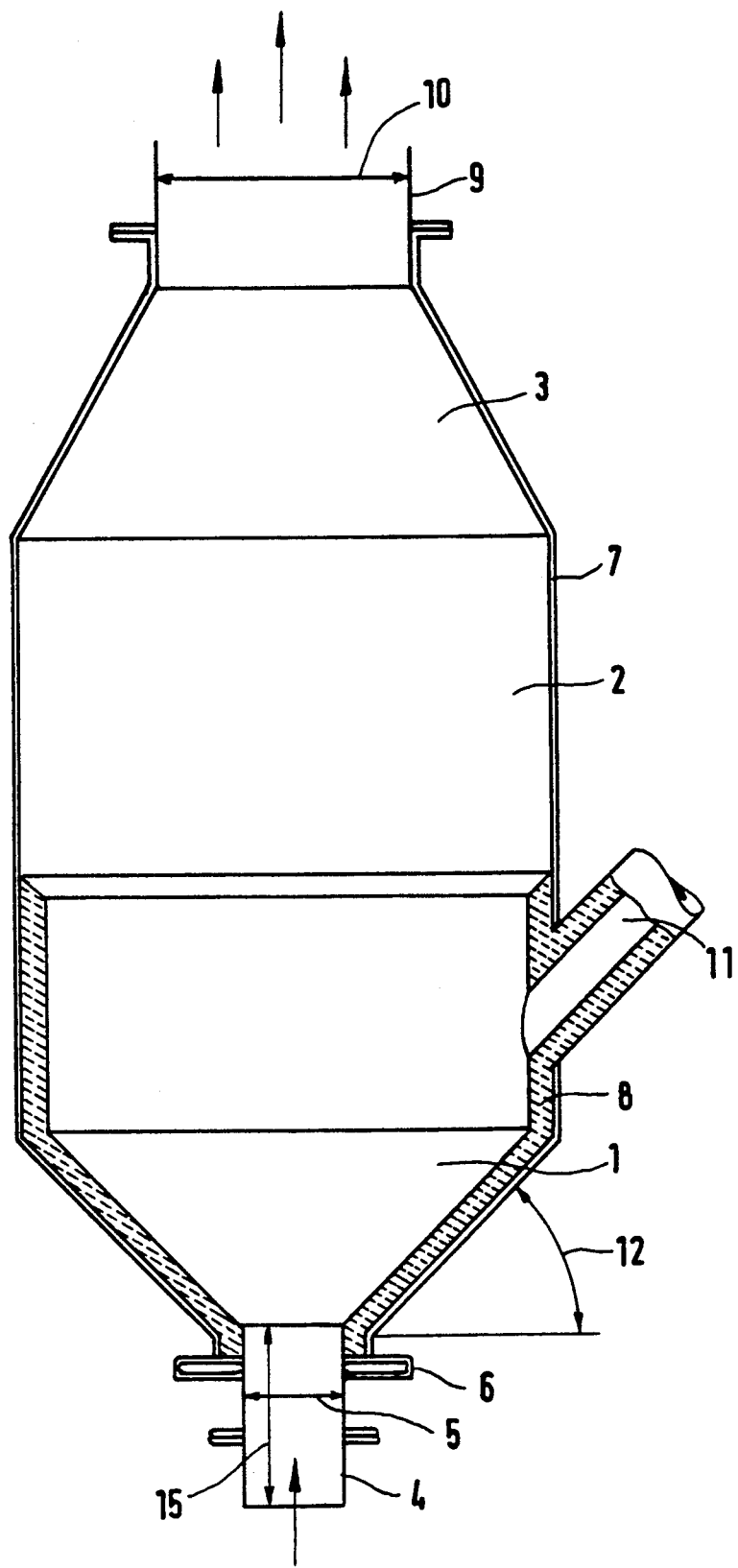
FIG. 1 shows a schematic representation of the mixing chamber of the inventive apparatus in cross section.

The mixing chamber 14 comprises a lower conic portion 1, a cylindrical body 2 and an upper conic portion 3. The reducing gas flows into the mixing chamber via pipe 4 that has diameter D 5 and length l 15. The ratio of length l 15 to diameter D 5 l/D is greater than 1. In the area of the reducing gas inlet port of the mixing chamber one can provide a ring nozzle 6 that is subjected to various gases in order to suppress crusts of glutinous waste gas solids and favorably influence the flow pattern in the mixing chamber.

The mixing chamber can also have a square or rectangular/elongate cross section. In this case, in which the inlet port is also square or rectangular, the l/D ratio refers to the ratio of length to the shorter side length of the inlet port.

Shell 7 of the mixing chamber is made of steel sheet. This shell can be wholly or partly positively cooled. In this case it is completely water-cooled (not shown). Lower cone 1 and partly also cylindrical body 2 are provided with a refractory lining 8. This refractory lining is mainly for insulation in order to adjust the heat dissipation of the fluid bed in the mixing chamber.

Riser pipe 9 having diameter 10 is directly connected to the mixing chamber. The solids pass back into the mixing chamber from the cyclone via solids return pipe 11. The pipe for feeding fine-grained raw ore into the fluid bed of the mixing chamber is not shown.

A preferred detail of the mixing chamber is lower conic vessel portion 1, in particular angle of inclination 12 for this cone. This lower vessel portion can be conic as shown here but other forms are also possible, e.g. in reactors with a rectangular cross section. Advantageous flow patterns for the fluid bed result with a central gas inlet port in the lower conic portion of the mixing chamber if angle of inclination 12 for conic portion 1 is 45° to 70°. For example an angle of inclination 12 of 65° has proven useful.

Figure 2:
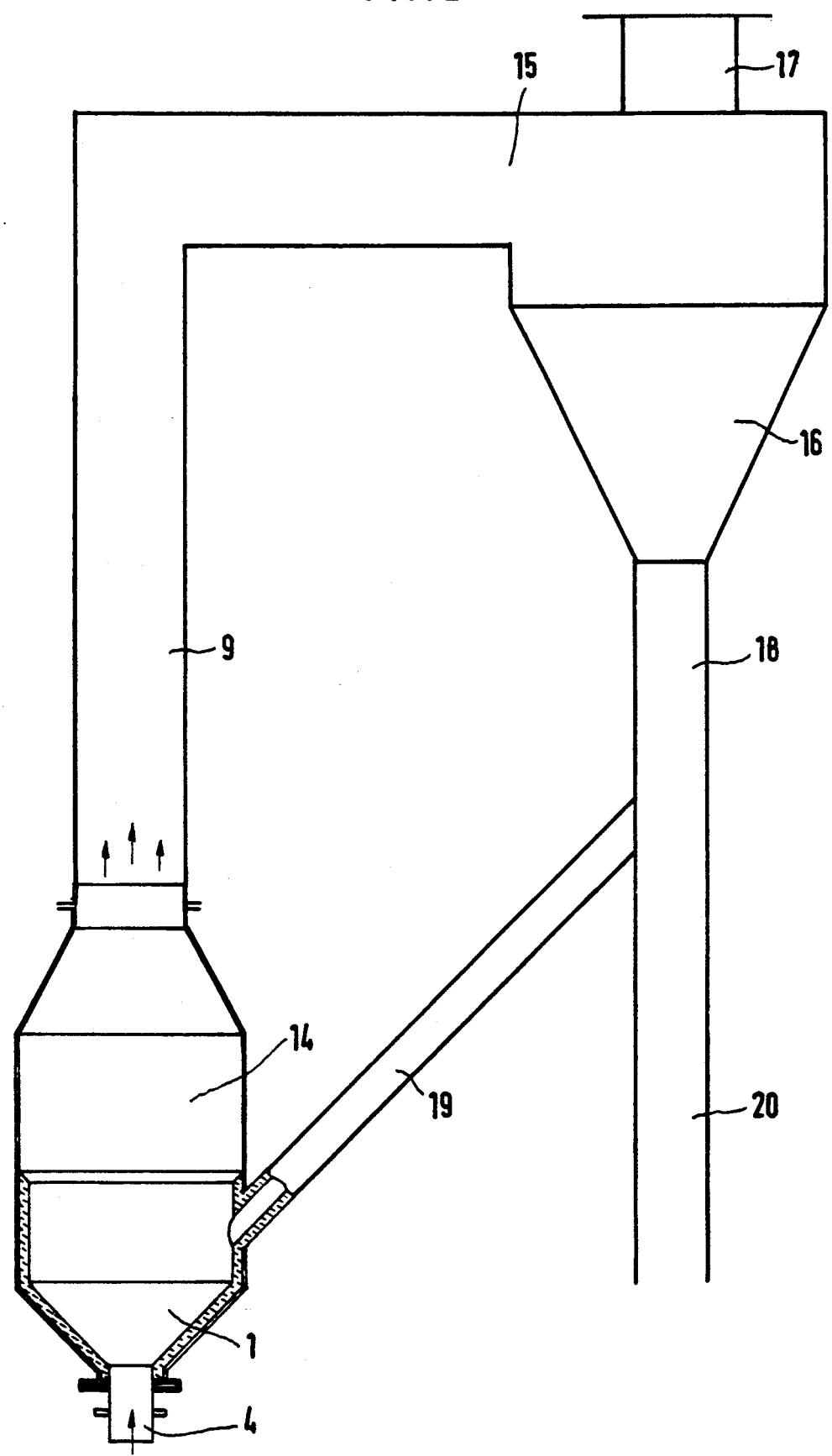
FIG. 2 shows a schematic representation of the inventive apparatus in cross section.

FIG. 2 shows a schematic representation of a fluid bed reactor on the principle of Fluxflow technology.

The gas-solid suspension flows from mixing chamber 14 through riser pipe 9 into cyclone 16 via admission port 15. In cyclone 16 the gas and solids are separated. The process gases leave the cyclone via gas outlet port 17 with a low fine dust loading.

The solids pass out of the cyclone through gas outlet pipe 18 and are partly recycled into mixing chamber 14 through solids return pipe 19. Another part of the solids can be fed for further use through downpipe 20.

The circulating solids from discharge pipe 18 pass via solids return pipe 19 into lower, usually conic portion 1 of mixing chamber 14. The hot gases, for example the hot reducing gas from a smelting reduction facility, also flow via pipe 4 into this portion 1 of the mixing chamber 14.

This pipe 4 for the hot gases that are supplied to lower portion 1 of mixing chamber 14 can be designed in different ways. The design of pipe 4 depends on the temperature of the hot inlet gases, on the one hand, and on the geometry and the distance involved in the adaptation of the Fluxflow reactor to the gas producer, on the other hand.

In case of low gas temperatures pipe 4 can be designed as a simple steel pipe; in case of higher gas temperatures this pipe is provided on the inside with a refractory insulating lining. For adaptation to a smelting reduction facility it has proven useful for example to replace this pipe directly by a bricked up channel.

In any case the length of this channel or the other stated pipes is clearly longer than the diameter of this hot gas feed pipe. It has proven advantageous to work with an l/D ratio greater than 1 in order to reliably prevent solid particles from falling back into this pipe. If large agglomerates of solid particles fall back into this gas inlet pipe from the mixing chamber they are dissolved into smaller solid parts there again, probably due to the high speed of this turbulent gas flow, and transported back into the mixing chamber by the flow. This advantageous effect has proven useful in particular with the specifically lighter dusts that are normally fed to the mixing chamber at a lower flow rate of over 35 m/sec. With specifically heavier solid particles, for example from a smelting reduction facility with specific weights of greater than 4 g/cm$^3$, the flow rate is usually clearly higher at least 60 m/sec, mostly over 100 m/sec, and experience has shown that solid particles no longer fall back into the hot gas feed pipe at this gas rate.

As a nonrestrictive example of the method for reducing metal ores in a fluid bed, the description will now relate to the prereduction of iron ore. The inventive process is an integral part of a smelting reduction facility for producing molten iron here.

To produce 500 t of molten iron a day in the smelting reduction facility 831 t of fine-grained ore are prereduced in the fluid bed together with slag forming agents and fed to the smelting reduction vessel in the heated state. The waste gas from this smelting reduction vessel, with an analysis of 16% CO, 10% $CO_2$, 3.6% $H_2$, 10% $H_2O$, 60.4% $N_2$, temperature 1680° C. and a dust loading of 2.9 t/h, flows directly into the mixing chamber of the fluid bed at a rate of 72,000 Nm$^3$/h and an inlet rate of 120 m/sec. In the inlet area of the mixing chamber there is a ring nozzle through which gas additionally flows in, particularly to counteract crusts that can form here from the entrained glutinous dust of the waste gas.

The mixing chamber and the lower half of the riser pipe are water-cooled. About 350 Nm$^3$/h of water flow through the cooling system, being heating thereby from 50° C. to 80° C.

Along with the stated waste gas, 32 t/h of ore and a multiple of this amount of prereduced ore are introduced into the mixing chamber via the solids return pipe. Part of the prereduced amount of ore is fed to the smelting reduction vessel (not shown in the Figure). The prereduced ore has a mean analysis of 24% $Fe_3O_4$, 58% FeO, 4% $SiO_2$, 7.6% CaO, 2.6% $Al_2O_3$, temperature 850° C.

In the riser pipe the fluid bed temperature is 900° C., and the solids flow together with 80,000 Nm$^3$/h of gas through the riser pipe into the cyclone.

The waste gas used for prereduction has a relatively low reduction potential since it comes from a smelting reduction process that works with an afterburning of about 50% of the reaction gases CO and $H_2$. It is of course within the scope of the invention to use reducing gases having a higher reduction potential and thus leading to a better degree of reduction for the metal ores. The flexibility and the possibility of combining this method with other processes or process steps is an advantageous feature of the invention.

A number of modifications, applications and changes are possible tn the described, preferred embodiments and examples without going beyond the scope and teachings of the invention.

We claim:

1. A method of providing a fluidized bed in which gas and particles react, utilizing a mixing chamber, a gas-particles separator, and an inlet pipe having a given minor dimension and opening up into the mixing chamber, said method comprising the steps of substantially continuously:
   (a) upwardly introducing gas into the mixing chamber through the inlet pipe at a rate of more than 35 m/sec, and at an approximately constant rate over a distance leading to the mixing chamber that is longer than the given minor dimension of the inlet, to freely move into the mixing chamber;
   (b) introducing particulate solids into the mixing chamber substantially independently of the introduction of gas in step (a);
   (c) passing a mixture of reacted particles and gas to the separator; and
   (d) separating particles from the gas in the separator, and returning some of the separated particles to the mixing chamber.

2. A method as recited in claim 1 wherein step (b) is practiced to introduce iron ore particles, and wherein steps (a)–(d) are practiced so that the temperature in the mixing chamber is between 750°–1050° C. to reduce the iron ore particles.

3. A method as recited in claim 1 wherein step (b) is practiced to introduce metal ore particles, and step (a) is practiced to introduce reducing gas for the metal ore particles, and wherein steps (a)–(d) are practiced to reduce the metal ore particles with the reducing gas at reducing temperature.

4. A method as recited in claim 1 comprising the further step of guiding a downward marginal flow of solid particles in the mixing chamber toward the gas inlet pipe so that particles are guided to hit hot gases introduced in step (a) at an angle of at least 20°.

5. A method as recited in claim 1 wherein step (a) is practiced by introducing waste gas from a smelting reduction vessel, and wherein steps (a)–(d) are practiced to cool the waste gas.

6. A method of providing a fluidized bed in which gas and particles react, utilizing a mixing chamber, a gas-particles separator, and an inlet pipe having a given minor dimension and opening up into the mixing chamber, said method comprising the steps of substantially continuously:
   (a) introducing gas into the mixing chamber through the inlet pipe at a rate of more than 60 m/sec, to freely move into the mixing chamber;
   (b) introducing particulate solids having a specific weight of more than 4 grams per cubic centimeter into the mixing chamber substantially independently of the introduction of gas in step (a);
   (c) passing a mixture of reacted particles and gas to the separator; and
   (d) separating particles from the gas in the separator, and returning some of the separated particles to the mixing chamber.

7. A method as recited in claim 6 wherein step (a) is practiced to introduce gas upwardly into the mixing chamber from the bottom thereof.

8. A method as recited in claim 6 wherein step (a) is further practiced to introduce gas at an approximately constant rate over a distance leading to the mixing chamber that is longer than the given minor dimension of the inlet pipe.

9. A method of providing a fluidized bed in which gas and particles react, utilizing a mixing chamber, a gas-particles separator, and an inlet pipe having a given minor dimension and opening up into the mixing chamber, and a coolant circulating lining for at least part of the mixing chamber, said method comprising the steps of substantially continuously:
  (a) upwardly introducing gas into the mixing chamber through the inlet pipe at a rate of more than 35 m/sec;
  (b) introducing particulate solids into the mixing chamber substantially independently of the introduction of gas in step (a);
  (c) passing a mixture of reacted particles and gas to the separator;
  (d) separating particles from the gas in the separator, and returning some of the separated particles to the mixing chamber; and
  (e) controlling the temperature in the mixing chamber by varying the type of coolant or flow rate of coolant or both, and by varying the rate of introduction of particles in step (b).

10. A method as recited in claim 9 wherein step (e) is further practiced by adding cooling or heating agents directly into the mixing chamber.

11. A method as recited in claim 9 wherein step (a) is further practiced to introduce gas at an approximately constant rate over a distance leading to the mixing chamber that is longer than the given minor dimension of the inlet pipe.

12. A method of providing a fluidized bed in which gas and particles react, utilizing a mixing chamber, a gas-particles separator, and an inlet pipe having a given minor dimension and opening up into the mixing chamber, said method comprising the steps of substantially continuously:
  (a) introducing gas into the mixing chamber through the inlet pipe at a rate of more than 35 m/sec;
  (b) introducing particulate solids into the mixing chamber substantially independently of the introduction of gas in step (a);
  (c) passing a mixture of reacted particles and gas to the separator;
  (d) separating particles from the gas in the separator, and returning some of the separated particles to the mixing chamber; and
  (e) controlling steps (a) and (b) so that the product stream density in the mixing chamber is between 10–200 kilograms per cubic meter, and so that the product stream density just before the separator is between 2–30 kilograms per cubic meter.

13. A method as recited in claim 12 wherein step (a) is practiced to introduce gas upwardly into the mixing chamber from the bottom thereof.

14. A method as recited in claim 12 wherein step (e) is practiced so that the product stream density in the mixing chamber is between 20–100 kilograms per cubic meter, and so that the product stream density just before the separator is between 3–10 kilograms per cubic meter.

15. A method as recited in claim 14 wherein step (a) is further practiced to introduce gas at an approximately constant rate over a distance leading to the mixing chamber that is longer than the given minor dimension of the inlet pipe.

16. A method of providing a fluidized bed in which gas and particles react, utilizing a mixing chamber, a gas-particles separator, and a gas inlet pipe having a given minor dimension and opening up into the mixing chamber, said method comprising the steps of substantially continuously;
  (a) upwardly introducing gas from a gas turbine combuster, gasifier, or other source of hot gases into the mixing chamber through the gas inlet pipe at a rate of between 35–80 m/sec;
  (b) introducing particulate solids having a specific weight of less than 4 grams per cubic centimeter and a particle size of between 4–200 micrometers into the mixing chamber substantially independently of the introduction of gas in step (a);
  (c) passing a mixture of reacted particles and gas to the separator; and
  (d) separating particles from the gas in the separator, and returning some of the separated particles to the mixing chamber;
  steps (a)–(d) being practiced so that no solid particles pass into the inlet pipe.

17. A method as recited in claim 16 wherein step (b) is practiced to introduce iron ore particles, and wherein steps (a)–(d) are practiced so that the temperature in the mixing chamber is between 750°–1050° C. to reduce the iron ore particles.

18. A method as recited in claim 16 wherein step (b) is practiced to introduce metal ore particles, and step (a) is practiced to introduce reducing gas for the metal ore particles, and wherein steps (a)–(d) are practiced to reduce the metal ore particles with the reducing gas at reducing temperature.

19. A method as recited in claim 16 comprising the further step of guiding a downward marginal flow of solid particles in the mixing chamber toward the gas inlet pipe so that particles are guided to hit hot gases introduced in step (a) at an angle of at least 20°.

20. A method as recited in claim 16 wherein step (a) is practiced by introducing waste gas from a smelting reduction vessel, and wherein steps (a)–(d) are practiced to cool the waste gas.

* * * * *